(12) United States Patent
Valls et al.

(10) Patent No.: US 10,638,514 B2
(45) Date of Patent: Apr. 28, 2020

(54) METHOD FOR OPERATING A PLURALITY OF WIRELESS NETWORKS

(71) Applicant: NEC Laboratories Europe GmbH, Heidelberg (DE)

(72) Inventors: Victor Valls, Girona (ES); Andres Garcia-Saavedra, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 16/074,789

(22) PCT Filed: Feb. 4, 2016

(86) PCT No.: PCT/EP2016/052425
§ 371 (c)(1),
(2) Date: Aug. 2, 2018

(87) PCT Pub. No.: WO2017/133778
PCT Pub. Date: Aug. 10, 2017

(65) Prior Publication Data
US 2019/0045543 A1    Feb. 7, 2019

(51) Int. Cl.
*H04W 74/08*    (2009.01)
*H04W 16/14*    (2009.01)

(52) U.S. Cl.
CPC ....... *H04W 74/0808* (2013.01); *H04W 16/14* (2013.01)

(58) Field of Classification Search
CPC ........................ H04W 74/0808; H04W 16/14
See application file for complete search history.

(56) References Cited

U.S. PATENT DOCUMENTS

| | | |
|---|---|---|
| 2013/0294356 A1 | 11/2013 | Bala et al. |
| 2013/0343288 A1 | 12/2013 | Ratasuk et al. |
| 2014/0029570 A1* | 1/2014 | Lee .................. H04W 36/0005 |

(Continued)

OTHER PUBLICATIONS

Kim Chung K et al: "Adaptive Listen-Before-Talk (LBT) scheme for LTE and Wi-Fi systems coexisting in unlicensed band", 2016 13th IEEE Annual Consumer Communications & Netowrking Conference (CCNC), IEEE, Jan. 9, 2016 (Jan. 9, 2016), pp. 589-594, XP032886992.

(Continued)

*Primary Examiner* — Ronald B Abelson
(74) *Attorney, Agent, or Firm* — Leydig, Voit & Mayer, Ltd.

(57) ABSTRACT

A method for operating a plurality of wireless networks includes blocking a channel in a second wireless network (SWN) by a first wireless network station (FWN-S) connected to a first wireless network (FWN) and the SWN within an overlapping frequency band. A time for performing blocking after a busy channel is smaller than a predetermined time period. The method further includes indicating part of a total airtime the channel in the SWN will be occupied by the first FWN-S for transmission. The total airtime is computed as a sum of time slots used for successful transmission, their number being computed such that the transmission performance of the SWN is not degraded more than the level of transmission performance is degraded if the first FWN-S would be operating for transmission within the SWN only.

17 Claims, 3 Drawing Sheets

(56) References Cited

U.S. PATENT DOCUMENTS

| | | |
|---|---|---|
| 2014/0287769 A1 | 9/2014 | Taori et al. |
| 2014/0362780 A1 | 12/2014 | Malladi et al. |
| 2015/0023315 A1 | 1/2015 | Yerramalli et al. |
| 2015/0049712 A1 | 2/2015 | Chen et al. |
| 2015/0049741 A1 | 2/2015 | Chen et al. |
| 2015/0223075 A1 | 8/2015 | Bashar et al. |
| 2015/0250002 A1 | 9/2015 | Sun et al. |
| 2017/0134261 A1* | 5/2017 | Seo .................. H04L 45/24 |

OTHER PUBLICATIONS

Ericsson: "Details of Listen-Before-Talk for LAA", 3GPP Draft; R1-145193, $3^{rd}$ Generation Patnership Project (3GPP), Mobile Competence Centre; 650, Route Des Lucioles; F-06921 Sophia-Antipolis Cedex; France vol. RAN WG1, 20141117-20141121, Nov. 13, 2014 (Nov. 13, 2014), XP050895524.

Cisco Systems: "Simulation results for Downlink Coexistence of LAA and Wi-Fi; BRAN(15)000031a1_Simulation_results_for_Downlink_Coexistence_of_LAA_and_Wi-Fi", vol. BRAN, Mar. 26, 2015 (Mar. 26, 2015), pp. 1-20, XP014236674.

Babaei Alireza et al: "On the impact of LTE-U in Wi-Fi performance", 2014 IEEE $25^{th}$ Annual International Symposium on Persona, Indoor, and Mobile Radio Communication (PIMRC), IEEE, Sep. 2, 2014 (Sep. 2, 2014), pp. 1621-1625, XP032789513.

3GPP TR 36.889 V13.0.0 (Jun. 2015), "$3^{rd}$ Generation Partnership Project; Technical Specification Group Radio Access Network; Study on Licensed-Assisted Access to Unlicensed Spectrum; (Release 13)", Jun. 2015, pp. 1-87.

* cited by examiner

METHOD FOR OPERATING A PLURALITY OF WIRELESS NETWORKS

CROSS REFERENCE TO RELATED APPLICATIONS

This application is a U.S. National Stage Application under 35 U.S.C. § 371 of International Application No. PCT/EP2016/052425 filed on Feb. 4, 2016. The International Application was published in English on Aug. 10, 2017 as WO 2017/133778 A1 under PCT Article 21(2).

FIELD

The present invention relates to a method for operating a plurality of wireless networks that operate at least in part in overlapping frequency bands. The present invention further relates to systems comprising at least two different wireless networks that operate at least in part in overlapping frequency bands.

BACKGROUND

Wireless communications have shifted from bit rates of few Mbps to Gbps in order to accommodate the increasing demand of bandwidth during the last ten years. Such increase in data rates has been achieved by means of using higher modulations schemes, improved channel codes, MIMO transmissions, etc. Nevertheless, the use of larger parts of the overall spectrum remains still the most effective and simple way to increase the network throughput.

In the case of cellular networks, operators have started to use the unlicensed band as a means of decongesting the scarce and expensive licensed spectrum. For instance, 3GPP Rel. 12 allows mobile devices to do offloading using an IEEE 802.11 network.

Coexistence with 802.11 WLANs has already been studied for Bluetooth, Zigbee and WiMaX. In the non-patent literature of Eduardo Almeida et al., "Enabling LTE/WiFi coexistence by LTE blank subframe allocation", in Communications (ICC), 2013 IEEE International Conference on, pages 5083-5088, a coexistence mechanism is proposed between LTE and 802.11 WLANs based on Almost Blank Subframes (ABS), i.e., almost silent periods in LTE transmissions, which is later extensively evaluated with simulations in the non-patent literature of Andre M Cavalcante et al., "Performance evaluation of LTE and Wi-Fi coexistence in unlicensed bands", in Vehicular Technology Conference (VTC Spring), 2013 IEEE 77th, pages 1-6, and analytically in the non-patent literature of Alireza Babaei et al., "On the impact of LTE-U on Wi-Fi performance, "in Personal, Indoor, and Mobile Radio Communication (PIMRC), 2014 IEEE 25th Annual International Symposium on, pages 1621-1625.

In the non-patent literature of Cristina Cano and Douglas J Leith, "Coexistence of WiFi and LTE in unlicensed bands: A proportional fair allocation scheme", in Communication Workshop (ICCW), 2015 IEEE International Conference on, vol., no., pp. 2288-2293, 8-12 Jun. 2015, and in the non-patent literature of Ahmed K Sadek et al., "Extending LTE to unlicensed band-merit and coexistence", in Communication Workshop (ICCW), 2015 IEEE International Conference on, pages 2344-2349, coexistence mechanisms and methods are proposed giving a certain degree of fairness.

All the aforementioned methods show that the throughput of LTE can be improved, but none of them are compliant with Listen-Before-Talk, 'LBT' mechanisms as specified in the non-patent literature of ETSI, EN 301 893 v1.8.1: "Broadband Radio Access Networks (BRAN); 5 GHz high performance RLAN; Harmonized EN covering essential requirements of article 3.2 of the R&TTE Directive". Therefore, they can only be deployed in some regions.

In the non-patent literature of 3rd Generation Partnership Project, 3GPP TR 36.889 v13.0.0—"Study on licensed-assisted access to unlicensed spectrum (release 13)" a range of LBT-compliant mechanisms and respective evaluations are presented. The results show that in some scenarios LTE-U can be configured to not degrade an 802.11 station more than if another station were added to the network. Nevertheless, the conventional configurations are implementation-dependent and some of the parameters are unlikely to be known in real networks. Further, none of the conventional methods determines how much additional throughput an LTE-U can obtain.

A further conventional method is Carrier Sense Adaptive Transmissions, 'CSAT', which comprises adapting the time a channel is used by an LTE station in order to provide coexistence/fairness to the network. CSAT however does not have any control on the access mechanism to the channel, i.e., it does not take into account if the channel is being used by a WiFi station.

In the US Patent Application US2015/0023315, a base station, 'BS', is disclosed a) performing a Clear Channel Assessment, 'CCA', and then b) transmitting a first waveform to a set of UEs over unlicensed spectrum when channel is sensed as idle. This is used for channel reservation. Then, one or more user equipment UE reply back with another waveform to indicate nearby WiFi devices that a BS has channel access, and another waveform to provide the BS with information for data transmission.

Other conventional methods are disclosed in the United States Patent Application US2015/0049741 and in the United States Patent Application US2015/0049712 for downlink and uplink unlicensed access respectively. In the United States Patent Application US2013/0343288 a power control for LTE is proposed to operate in unlicensed bands with minimum impact to WiFi networks while maximizing channel utilization. A conventional LBT scheme is disclosed in the United States Patent Application 20140362780 for carrier aggregation in the uplink using CCA.

SUMMARY

In an embodiment, the present invention provides a method for operating a plurality of wireless networks, the plurality of wireless networks including at least a first wireless network (FWN) and a second wireless network (SWN). The FWN includes one or more first network stations (FWN-S) and the SWN includes one or more second network stations (SWN-S). Transmission between the SWN-S within the SWN is performed via channels, wherein after each successful transmission a channel is free of transmissions for a predetermined time period (PTP). The FWN and the SWN operate at least in part in overlapping frequency bands. The method includes blocking a channel in the SWN by a first FWN-S connected to the FWN and the SWN within an overlapping frequency band, wherein a time for performing blocking after a busy channel is smaller than a PTP; and indicating part of a total airtime the channel in the SWN will be occupied by the first FWN-S for transmission. The total airtime is computed as a sum of time slots used for successful transmission, their number being computed such that the transmission performance of the SWN is not degraded more than the level of transmission performance is degraded if the first FWN-S would be operating for transmission within the SWN only.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods for operating a plurality of wireless networks, comprising at least two different wireless networks, a first wireless network, 'FWN', and a second wireless network, 'SWN', each network comprising one or more stations, 'FWN-S', 'SWN-S', connected to each other within the respective network and forming said respective network, wherein transmission between said SWN-S within the SWN is performed via channels, wherein after each successful transmission a channel is free of transmissions for a predetermined time period, 'PTP', and wherein said FWN and said SWN operate at least in part in overlapping frequency bands.

Further embodiments of the present invention provide systems comprising at least two different wireless networks, a first wireless network, 'FWN', and a second wireless network, 'SWN', each network comprising one or more stations, 'FWN-S', 'SWN-S', connected to each other within the respective network forming said respective network, wherein transmission between said SWN-S within the SWN is performed via channels, wherein after each successful transmission a channel is free of transmissions for a predetermined time period, 'PTP', and wherein said FWN and said SWN operate at least in part in overlapping frequency bands.

Although applicable to wireless networks in general, the present invention will be described with regard to LTE-based networks and WLAN IEEE 802.11-based networks respectively.

Although applicable in general to any kind of frequency bands, the present invention will be described with regard to LTE-unlicensed bands.

Embodiments of the invention provide for enabling a fair coexistence in the sense that access time for a station in a first network within the second network's channel is maximized while reducing collisions with existing transmissions within a second network.

According to an embodiment, the present invention provides a method for operating a plurality of wireless networks, comprising at least two different wireless networks, a first wireless network, 'FWN', and a second wireless network, 'SWN', each network comprising one or more stations, 'FWN-S', 'SWN-S', connected to each other within the respective network and forming said respective network, wherein transmission between said SWN-S within the SWN is performed via channels, wherein after each successful transmission a channel is free of transmissions for a predetermined time period, 'PTP', and wherein said FWN and said SWN operate at least in part in overlapping frequency bands, comprising the steps of Blocking a channel in the SWN by a FWN-S, connected to said FWN and SWN within an overlapping frequency band, wherein the time for performing blocking after a busy channel is smaller than a PTP, and Indicating part of a total airtime said channel in the SWN will be occupied by said FWN-S for transmission, wherein the total airtime is computed as a sum of time slots used for successful transmission, their number being computed such that the transmission performance of said SWN is not degraded more than the level of transmission performance is degraded if said FWN-S would be operating for transmission within said SWN only.

According to a further embodiment, the present invention provides to a system comprising at least two different wireless networks, a first wireless network, 'FWN', and a second wireless network, 'SWN', each network comprising one or more stations, 'FWN-S', 'SWN-S', connected to each other within the respective network and forming said respective network, wherein transmission between said SWN-S within the SWN is performed via channels, wherein after each successful transmission a channel is free of transmissions for a predetermined time period, 'PTP', and wherein said FWN and said SWN operate at least in part in overlapping frequency bands, wherein said FWN-S is adapted:

to block a channel in the SWN, said FWN-S connected to said FWN and SWN within an overlapping frequency band, wherein the time for performing blocking after a busy channel is smaller than a PTP, and to indicate part of a total airtime said channel in the SWN will be occupied by said FWN-S for transmission, wherein the total airtime is computed as a sum of time slots used for successful transmission, their number being computed such that the transmission performance of said SWN is not degraded more than the level of transmission performance is degraded if said FWN-S would be operating for transmission within said SWN only.

The term "airtime" can be understood to refer to channel time successfully used to transmit data. The term "transmission performance" can be understood to refer to the amount of said "airtime."

At least one embodiment of the present invention may have at least one of the following advantages:

avoiding degradation in transmission performance beyond the level that would be experienced when having a second network only, maximizing the transmission time, no need to modify existing stations in the second wireless network, enhanced flexibility in the sense of complying with European regulations.

Throughout the description the following abbreviations are used unless otherwise indicated:

AIFS—Arbitration Inter-Frame Space
AP—Access Point
BS—Base Station
CCA—Clear Channel Assessment
CSAT—Carrier Sense Adaptive Transmission
CTS—Clear To Send
DCF—Distributed Coordination Function
LBT—Listen Before Talk LTE-U—LTE in the Unlicensed Bands
MAC—Medium Access Control
UE—User Equipment Blocking of a channel may comprise checking if said channel is free of transmissions. This ensures that collisions are reduced and thus performance within the SWN is decreasing.

Blocking of said channel may comprise sending said information indicating the occupancy time of said channel. This allows that stations in the SWN do not transmit when said FWN-S is transmitting in the SWN.

Said checking may be performed at the beginning of a PTP. This ensures that the channel is always sensed idle.

When said channel is sensed busy another checking may be performed based on a Listen-Before-Talk operation mode. For instance this enhances the flexibility since this allows using for example the frame-based equipment FBE or the load based-equipment LBE operation mode which is described in the non-patent literature of ETSI. EN 301 893 v1.8.1: "Broadband Radio Access Networks (BRAN); 5 GHz high performance RLAN; Harmonized EN covering essential requirements of article 3.2 of the R&TTE Directive" and in the non-patent literature of Alireza Babaei, Jennifer Andreoli-Fang, and Belai Hamzeh, "On the impact of LTE-U on Wi-Fi performance, in Personal, Indoor, and Mobile Radio Communication (PIMRC), 2014 IEEE 25th Annual International Symposium on, pages 1621-1625. The FBE operates as follows: Before a transmission a station fixes the time T that it aims to occupy the channel. If the channel is detected idle during the CCA the station transmits and waits 5% of the time T before performing another CCA. In case the channel is declared busy the station will have to wait a time T before performing another CCA. That is, the penalty for finding the channel busy is proportional to the amount of time the station would have used it in case it was sensed idle. Time T must be selected between 1 and 10 ms and control messages (e.g., acknowledgements) which are triggered by the receiver can be transmitted without requirement of another CCA as long as time T is not exceeded.

A time period may be specified indicating a period with a number of PTPs wherein said FWN-S then transmits after every PTP. This enables to maximize the performance for transmission within said period.

Said number of PTPs may be dependent on the fraction of idle slots for transmission in said SWN that would have to change to non-idle slots for an expected transmission duration. This enables a so-called duty cycle-based operation: A number $\Delta$ is defined; this is a period of PTP opportunities (AIFS opportunities in the context of IEEE 802.11). Then, an FWN-S, e.g. an LBT-node, transmits after every AIFS opportunity during a total number of $\rho P_{idle}^{(n)}\Delta$ opportunities (This is an "on" period). Then, it skips the next $(1-\rho P_{idle}^{(n)})\Delta$ opportunities, wherein the quantity $\rho P_{idle}^{(n)}\Delta$ captures the fraction of idle slots in the network that would have to change to successful slots in order to accommodate transmission of expected duration. $\rho$ is a configuration parameter and $P_{idle}^{(n)}$ is the fraction of idle slots in a SWN with n SWN-Ss.

Said FWN-S may transmit after every PTP with a probability indicating the fraction of idle slots for transmission in said SWN that would have to change to non-idle slots for expected transmission duration. This allows a so-called Aloha-based operation. If for example a Listen-Before-Talk node is used as station then said FWN-S transmits for every AIFS opportunity with a probability $\rho P_{idle}^{(n)}$ Said FWN-S may transmit only after a certain number of PTPs. This enables a DCF-based operation.

A backoff counter may be decremented to count said number of PTPs. This allows an implementation of a DCF-based operation.

Traffic within the SWN may be analysed to estimate the number of active SWN-Ss and if said active SWN-S are not saturated and one or more FWN-S do not have enough traffic to send in order to cause saturation of said SWN-Ss, then the total airtime is set to infinity. An FWN-S can increase the load until SWN channel is saturated, though SWN-Ss are using the amount of channel time each of them need. This makes it possible to estimate an approximation to $P_{idle}^{(n)}$ easily. However, if the SWN-S are not saturated and the FWN-S do not have enough traffic to cause saturation of said SWN-S then there is no coexistence issue because all nodes would be transmitting at the rate they want.

The total airtime may be recomputed periodically. The frequency of the recomputation may be application- or implementation-dependent. Recomputing the total airtime periodically enables to include changing traffic characteristics or load within the SWN.

Said FWN-S may always transmit after a predetermined number of sequential idle transmission slots in said SWN. This enables to consider low load within the SWN: If the load for example of WiFi stations is low then the rate of transmission opportunities for the FWN-S is low as well. If a threshold $\alpha$ for the number of sequential idle WiFi slots is set then the FWN-S restarts for example a backoff counter to said number for every busy slot. This counter may be decremented for every idle WiFi slot. If it reaches zero then the FWN-S will attempt to transmit as if they were a transmission opportunity in that slot and restarts the backoff counter to said threshold.

Said threshold may be set dynamically. For instance: $\alpha$ is set to $\alpha_{max}$ every WiFi transmission and decremented by a number q every time the backoff counter reaches zero until a value $\alpha=\alpha_{min}$ is reached.

Said FWN may be a LTE-based wireless network and said SWN may be an 802.11-based wireless network and said checking may be performed in form of a clear channel assessment, 'CCA' and said information may be provided in form of a CTS-to-self message. This allows an easy implementation when the first network is a LTE-network and the second network is a WiFi network.

There are several ways how to design and further develop the teaching of the present invention in an advantageous way. To this end it is to be referred to the patent claims subordinate to independent patent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

Figure 1:
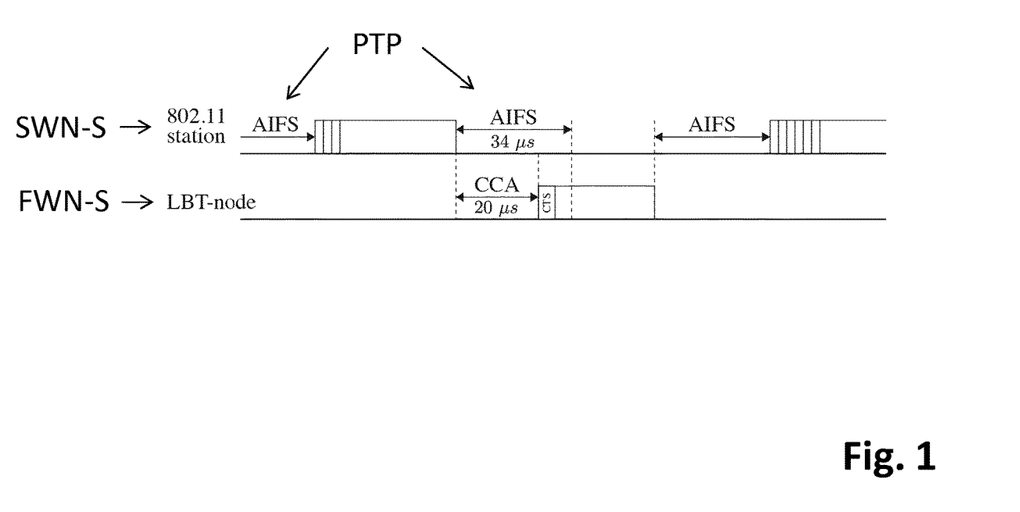
FIG. 1 shows steps of a method according to an embodiment of the present invention.

FIG. 1 shows steps of a method according to an embodiment of the present invention. In FIG. 1 a schematic illustration of the coexistence mechanism/procedure is shown using a 20 µs CCA as an example.

In the non-patent literature of ETSI, EN 301 893 v1.8.1: "Broadband Radio Access Networks (BRAN); 5 GHz high performance RLAN; Harmonized EN covering essential requirements of article 3.2 of the R&TTE Directive", it is specified that before a transmission a station must perform a Clear Channel Assessment (CCA) using energy detection for at least 20 µs. Namely, depending on the energy detected during a time equal or greater 20 µs the channel is declared idle or busy. In case the channel is declared idle the station can start a transmission immediately, otherwise it will need to perform another CCA. When to perform another CCA after the channel is declared busy or idle depends on the LBT operation mode, which can be Frame Based Equipment (FBE) and Load Based Equipment (LBE)—both specified in the non-patent literature of ETSI. EN 301 893 v1.8.1: "Broadband Radio Access Networks (BRAN); 5 GHz high performance RLAN; Harmonized EN covering essential requirements of article 3.2 of the R&TTE Directive", and already mentioned above.

Further in the following the SWN is a IEEE 802.11 network (with WiFi or 802.11 nodes) and the FWN is an LBT-based LTE network (with LBT-nodes), said IEEE 802.11 network being divided in MAC slots and a station in said network transmits after observing $Y_m$ idle slots, where $Y_m$ is a random variable selected uniformly at random from $\{0, 1, \ldots, 2^m CW_{min}-1\}$ where m=0, 1, 2, . . . is the number of successive collisions experience by the station. After a successful transmission m is set to 0. According to IEEE 802.11 a parameter $CW_{max}$ is defined that limits the expected number of idle slots a station has to wait after m successive collisions, i.e., $2^m CW_{min}=CW_{max}$ for m≥$\overline{m}$.

In IEEE 802.11 WLANs the following procedures are implemented:
1) 802.11 includes in the packet the transmission duration, i.e., once upon correct reception of a packet header an 802.11 station knows until when the channel will be busy;
2) After every successful transmission all stations in the WLAN wait for an Arbitration Inter-Frame Spacing (AIFS) time of at least 34 μs. The AIFS values depend on version of the amendment, packet's Access Category (AC) and vendor's configuration on the access point. This is, after each successful transmission there will be at least 34 μs where the channel will be free of 802.11 transmissions.

In one or more of the embodiments of the invention the minimum duration of an AIFS (34 μs) is longer than the CCA minimum time (20 μs) specified in the regulation ETSI 301 893 v1.8.1. Thus the CCA (20 μs) is smaller than 34 μs of the AIFS, i.e. in general any CCA that is smaller than an AIFS can be used. Then, if an LBT-node performs a CCA at the beginning of an AIFS period, the channel will be sensed idle and the LBT-node (with FBE) will transmit before any 802.11 station does. The latter is always be true if there is no interference that makes the LBT-node sense the channel busy, which is assumed to be the case here. An LBT-node can determine when an AIFS period starts by scanning the network traffic with an IEEE 802.11 interface. Any minimum CCA time allowed in the above-mentioned regulation being lower than 34 μs is valid for future modifications of the same.

Embodiments of the invention enable:
An LBT-node to perform a CCA only at the beginning of an AIFS period.
In each transmission an LBT-node sends first a CTS-to-self or other form of signaling indicating the time the channel will be occupied, said CTS-to-self being used by access points to prevent a transmission from being interrupted.

The first point enables that the channel is always sensed idle and the second point enables that the 802.11 stations do not transmit while the LBT-node is transmitting. In effect, said procedure can be informally regarded as having an 802.11 station with higher AC that only transmits after successful transmissions. An LBT-node thus does not affect the transmission probability attempts of the stations in the WLAN, and therefore, the airtime in the system is divided into two orthogonal airtimes. It is assumed here that embodiments may need 802.11 transmissions in order to work; however, when there are no sufficient 802.11 transmission load in the network there is no problem with coexistence.

An embodiment of the present invention is schematically illustrated in FIG. 1 with a network with one 802.11 station and one LBT-node: The LBT-node is able to transmit before the 802.11 station does and that the next AIFS period starts when the LBT-node has finished its transmission.

So far it was specified how the LBT-node should transmit, but not how much airtime an LBT-node can use in order to be compliant with a coexistence criterion: not to degrade the throughput of the WLAN more than if an 802.11 station were added to the network. In the following, the maximum airtime an LBT-node can use to meet said requirements/criterion is computed.

Based on WLAN with ideal channel conditions and n saturated stations, i.e., each station always has a packet ready for transmission. The conditional transmission attempt probability of a station in a MAC slot (which depends on the number of stations and the BEB configuration) can be expressed as the probability of transmitting in each MAC slot with a fix probability as for example described in the non-patent literature of G. Bianchi and I. Tinnirello, "Remarks on IEEE 802.11 DCF performance analysis", in Communications Letters, IEEE, 9(8):765-767, August 2005. That is, a station i∈{1, . . . , n} transmits in a MAC slot with probability $\tau_i^{(n)} \in [0, 2/(CW_{min}+1)]$. For simplicity of exposure it is assumed that the stations in the WLAN are homogeneous and therefore $\tau^{(n)}=\tau_i^{(n)}$ for all i∈{1, . . . , n}.

Then, the probability that a MAC slot is idle is given by the probability that none of the stations in the network transmit, $P_{idle}^{(n)}=(1-\tau^{(n)})^n$; the probability that it is occupied by a successful transmission is $P_{succ}^{(n)}=np_{succ}^{(n)}$, where $p_{succ}^{(n)}=\tau^{(n)}(1-\tau^{(n)})^{n-1}$ is the probability that a single station transmits in a MAC slot. Finally, the probability that a slot is occupied by a collision is given by $P_{coll}^{(n)}=1-P_{idle}^{(n)}-P_{succ}^{(n)}$ and the probability of a slot being busy is $P_{tx}^{(n)}=P_{coll}^{(n)}+P_{succ}^{(n)}$. The throughput of a station is given by $$s^{(n)} = \frac{p_{succ}^{(n)} B}{P_{idle}^{(n)} \sigma + (1 - P_{idle}^{(n)}) T}$$

where σ, B and T are, respectively, the duration of a MAC slot, the expected number of bits in a transmission and the expected duration of a transmission (successful or collision).

As described above the transmission of the LBT-nodes are orthogonal to 802.11 transmissions and the throughput of a station in a WLAN is non-increasing with the number of stations, i.e., $s^{(n)} \geq s^{(n+1)}$ for every n=1, 2, . . . . For simplicity of exposure only the case is considered here where the LBT-node captures the impact of one additional 802.11 station in the network, however, the extension to multiple stations is described below.

There always exists an airtime A≥0 such that the following holds:

$$s^{(n+1)} = \frac{p_{succ}^{(n+1)} B}{P_{idle}^{(n+1)} \sigma + P_{tx}^{(n+1)} T} \leq \frac{p_{succ}^{(n)} B}{P_{idle}^{(n)} \sigma + P_{tx}^{(n+1)} T + A} := s^{(n+LBT)}$$

where $s^{(n+LBT)}$ is the throughput that an 802.11 station would experience if an LBT-network used A airtime. Since the stations are saturated and the LBT-network is orthogonal, the transmission attempts probabilities of the 802.11 stations in (2) does not change for any A≥0.

To work in terms of fractions of MAC slots rather than airtime, i.e., the airtime is written as $$A = \rho P_{idle}^{(n)}(T'-\sigma)$$

where $\rho \in [0,1]$ and $T' \geq 0$. The quantity $\rho P_{idle}^{(n)}$ captures the fraction of idle slots in the system that would have to change to successful slots in order to accommodate transmissions of expected duration (T'−σ).

The LBT-node acts like an 802.11 station that knows in which MAC slots to transmit in order to not collide with the other stations in the WLAN. With this change of variable the RHS in (2) can be written as follows $$s^{(n+1)} \leq \frac{p_{succ}^{(n)} B}{P_{idle}^{(n)}\sigma + (1 - P_{idle}^{(n)})T + \rho P_{idle}^{(n)}(T' - \sigma)} = s^{(n+LBT)}$$

Then the expression $\rho P_{idle}^{(n)}(T'-\sigma)$ such that (4) holds.

When considering a WLAN with n homogeneous stations in saturated conditions and with T, T'>σ. Then, for every $\rho \in [0, \bar{\rho}]$ with $$\bar{\rho} := \min\left\{1, \left(\frac{T-\sigma}{T'-\sigma}\right)\min\left\{1, \frac{P_{tx}^{(n+1)}}{p_{succ}^{(n+1)}} \frac{p_{succ}^{(n)}}{P_{idle}^{(n)}} - \frac{P_{tx}^{(n)}}{P_{idle}^{(n)}}\right\}\right\}$$

equation (4) holds, i.e. $\bar{\rho} P_{idle}^{(n)}$ is the maximum fraction of orthogonal transmissions an LBT network should do to meet or satisfy coexistence criterion, i.e. shows the fraction of idle slots that could be occupied with successful transmissions of expected duration T'−σ while being compliant with the coexistence criterion. The bound in equation (5) depends on $P_{tx}^{(n+1)}$ and $p_{succ}^{(n+1)}$, but in saturation conditions a good approximation of these values can be easily obtained as shown in the non-patent literature of Giuseppe Bianchi, "Performance analysis of the IEEE 802.11 distributed coordination function, in Selected Areas in Communications, IEEE Journal on, 18(3):535-547, 2000.

Alternatively, if some throughput degradation is accepted for WiFi stations, LBT-nodes can transmit with $$\rho \in \left[0, \frac{2}{(CW_{min}+1) P_{idle}^{(n)}}\right]$$

To implement said coexistence procedure that guarantees zero impact to WiFi stations the following options may be applicable:

Duty cycle-based: A number Δ is defined; this is a period of AIFS opportunities. Then, an LBT-node transmits after every AIFS opportunity during a total number of $\rho P_{idle}^{(n)} \Delta$ opportunities (This is an "on" period). Then, it skips the next $(1-\rho P_{idle}^{(n)})\Delta$ opportunities.

Aloha-based: An LBT-node transmits for every AIFS opportunity with probability $\rho P_{idle}^{(n)}$ DCF-based: An LBT-node chooses a contention window uniformly at random between $$\left[0, \frac{2}{\rho P_{idle}^{(n)}} - 1\right]$$

and sets a backoff counter to this number every time it needs to transmit data. The backoff counter is decremented for every AIFS opportunity until it reaches zero when it transmits.

In case of multiple LBT-nodes can happen. To handle multiple LBT-nodes, collisions in some cases, it can be assumed that nodes can be efficiently coordinated in a centralised manner. For instance, by means of the duty cycle-based scheme proposed previously interleaving "on" periods of different LBT-nodes so they do not overlap.

If coordination is not possible, Aloha-based or DCF-based schemes could be implemented to allow multiple LBT-nodes to coexist. In the first case, each LBT-node will transmit for every AIFS opportunity with $$\frac{\rho_{n,k}}{k} P_{idle}^{(n)},$$

where k is the estimated number of LBT-nodes contending. In the second case (DCF-based) the contention window shall be set to $$\bar{\rho}_{n,k} := \min\left\{1, \left(\frac{T-\sigma}{T'-\sigma}\right)\min\left\{1, \frac{P_{tx}^{(n+k)}}{p_{succ}^{(n+k)}} \frac{p_{succ}^{(n)}}{P_{idle}^{(n)}} - \frac{P_{tx}^{(n)}}{P_{idle}^{(n)}}\right\}\right\}$$

Since LBT and 802.11 airtimes are orthogonal, any increase of the LBT airtime is equivalent to increasing the load of the stations in the network. An LBT-node thus affects a non-saturated 802.11 station in a WLAN either by leaving it non-saturated or saturating it. If the stations do not get saturated, coexistence is then irrelevant since all traffic can be served; and when the stations change to saturation, the optimal airtime can be computed so that the LBT-node does not affect more than an 802.11 station. Since the LBT-node does not collide with the 802.11 stations, the traffic in the network can be analysed to determine the number of contending station in the network as disclosed in the non-patent literature of G. Bianchi and I. Tinnirello, "Kalman filter estimation of the number of competing terminals in an IEEE 802.11 network", in INFOCOM 2003. Twenty-Second Annual Joint Conference of the IEEE Computer and Communications. IEEE Societies, volume 2, pages 844-852 vol. 2, March 2003. Further, under regularity conditions it is possible to determine which fraction of stations in the network are actually saturated.

The parameter $\rho_{n,k} \in [0, \bar{\rho}_{n,k}]$ depends on the traffic characteristics/load in the network, and so it can be periodically recomputed. The frequency $\rho_{n,k}$ is recomputed is a design parameter.

If the load of WiFi stations is low, the rate of transmission opportunities for LBT-nodes will be overly low as well. LBT-nodes can then set a threshold α of number of sequential idle WiFi slots. LBT-nodes may then restart a backoff counter to α for every busy slot. This counter is decremented for every idle WiFi slot; if it reaches zero, then the LBT-node will attempt to transmit as if it were an AIFS opportunity in that slot and restarts the backoff counter to α.

Figure 2:
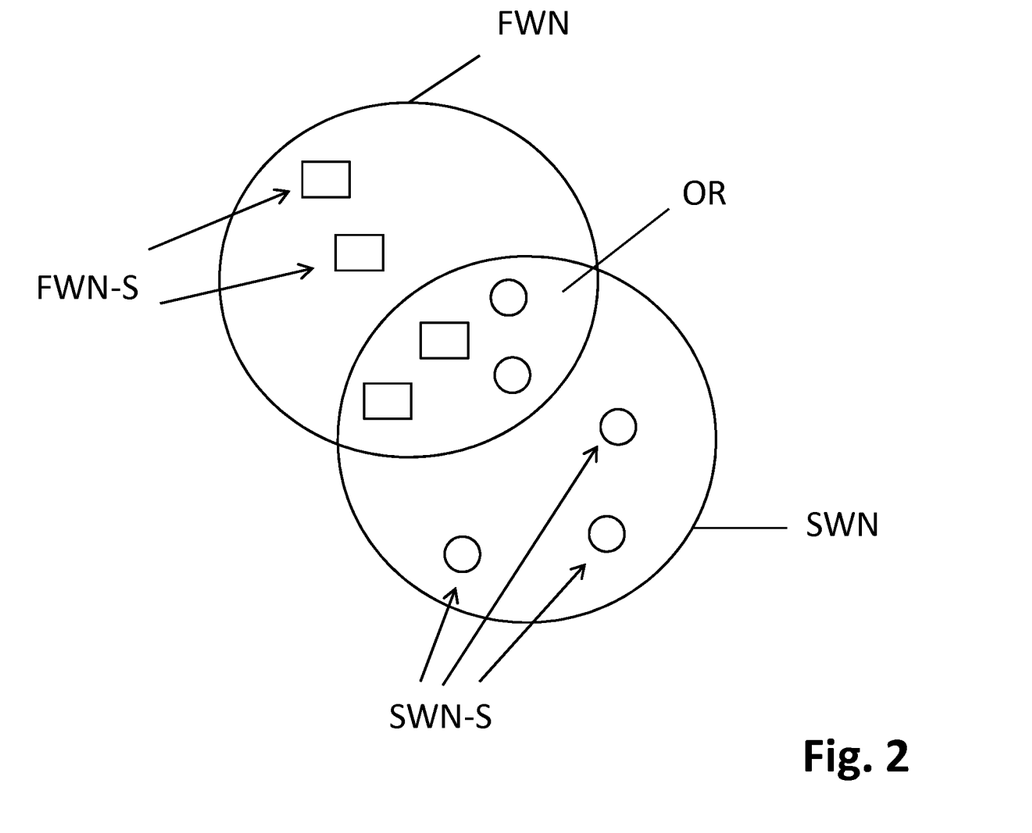
FIG. 2 shows a system according to a further embodiment of the present invention.

Said threshold α can be set dynamically, for instance: α is set to $\alpha_{max}$ every WiFi transmission and decremented by a number q every time the backoff counter reaches zero until a value $\alpha = \alpha_{min}$ is reached FIG. 2 shows a system according to a further embodiment of the present invention. In FIG. 2 a scenario on which embodiments of the invention are based is shown.

A first wireless network comprises a plurality of stations FWN-S and a second wireless network SWN comprises a plurality of stations SWN-S. Said first wireless network FWN and said second wireless network SWN are overlapping not only in frequency than but also in terms of connecting ranges. In the overlapping region OR the first wireless network stations FWN-S may use second wireless network stations SWN-S for orthogonal transmission.

Figure 3:
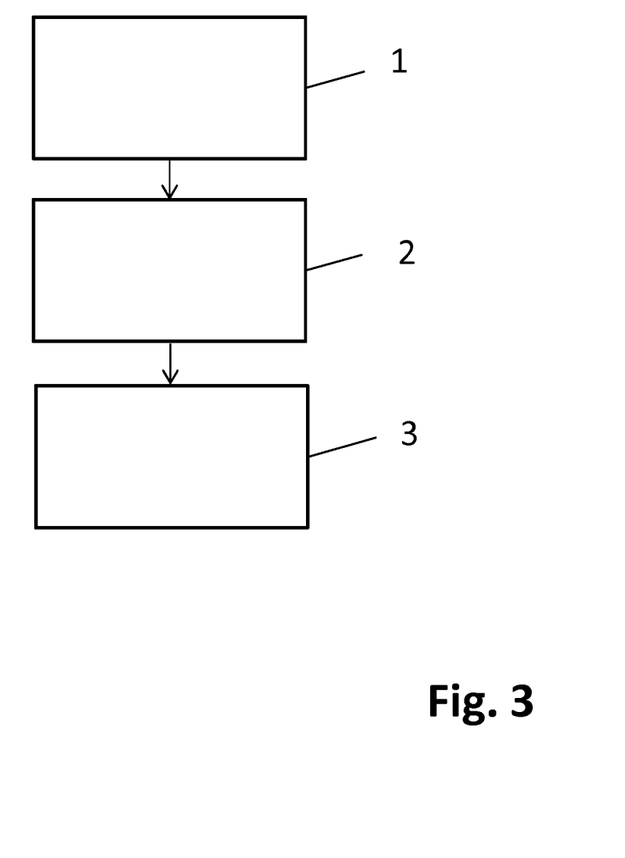
FIG. 3 shows steps of a method according to a further embodiment of the present invention.

FIG. 3 shows some steps of a method according to a further embodiment of the present invention. In FIG. 3 steps of the matter for operating a plurality of networks is shown: In a first step a CAA is performed with the 20 µs limit. In a second step computation of a number of slots is performed that can be used for a LTE-U transmissions. In a third step LTE-U transmission is performed according to the level computed.

In summary, one or more embodiments the present invention can enable at least one of the following:
1) Blocking the channel for LTE-U transmissions before WiFi stations in a regulatory compliant way.
2) Computing the unlicensed channel number of slots that can be used for LTE-U transmissions without degrading WiFi stations performance below the level that would be experienced in a WiFi network only.
3) Maximizing the LTE-U transmission time based on the computed limit.

At least one embodiment of the present invention may have one of the following advantages
It complies with European regulation;
It does not modify the behavior of existing WiFi;
It does not require modifications to the existing WiFi equipment.
It improves the throughput of LBT-nodes without impacting existing WiFi devices more than another legacy WiFi device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a plurality of wireless networks, the plurality of wireless networks including at least a first wireless network (FWN) and a second wireless network (SWN), wherein the FWN includes one or more first network stations (FWN-S), wherein the SWN includes one or more second network stations (SWN-S), wherein transmission between the SWN-S within the SWN is performed via channels, wherein after each successful transmission a channel in the SWN is free of transmissions for a first predetermined time period (PTP), and wherein the FWN and the SWN operate at least in part in overlapping frequency bands, the method comprising:
performing, by a first FWN-S connected to the FWN and the SWN within an overlapping frequency band, at a beginning of a respective first PTP:
blocking, during a second PTP, the channel in the SWN, wherein the first FWN-S is connected to the FWN and the SWN within an overlapping frequency band, and wherein the second PTP is shorter than the first PTP; and
transmitting, after the second PTP but before an end of the respective first PTP, a signal indicating part of a total airtime the channel in the SWN will be occupied by the first FWN-S for transmission,
wherein the total airtime is computed as a sum of a number of time slots required for successful transmission, the number of time slots being computed such that a transmission performance of the SWN is not degraded more than a level of transmission performance degradation caused by an addition of an SWN-S to the SWN.

2. The method according to claim 1, wherein blocking of the channel comprises checking if the channel is free of transmissions.

3. The method according to claim 2, wherein the checking is performed at the beginning of the respective first PTP.

4. The method according to claim 1, further comprising checking, by the FWN-S during a previous first PTP, if the channel is free of transmissions and sensing, during the previous first PTP, that the channel is busy,
wherein the checking if the channel is free of transmissions is performed based on a Listen-Before-Talk (LBT) operation mode.

5. The method according to claim 1, wherein a time period is specified indicating a period with a number of first PTPs, and wherein the first FWN-S transmits after every first PTP of the number of first PTPs in the specified time period.

6. The method according to claim 5, wherein the number of first PTPs is dependent on a fraction of idle slots for transmission in the SWN that would be required to be changed to non-idle slots for an expected transmission duration.

7. The method according to claim 1, wherein the first FWN-S transmits after every first PTP with a probability indicating a fraction of idle slots for transmission in the SWN that would be required to be changed to non-idle slots for an expected transmission duration.

8. The method according to claim 1, wherein the first FWN-S transmits only after a certain number of first PTPs.

9. The method according to claim 8, wherein a backoff counter is decremented to count the number of first PTPs.

10. The method according to claim 1, wherein traffic within the SWN is analyzed to estimate a number of active SWN-S and if the active SWN-S are not saturated and one or more FWN-S do not have enough traffic to send in order to saturate SWN-Ss, then the total airtime is not limited.

11. The method according to claim 1, wherein the first FWN-S always transmits after a predetermined number of sequential idle transmission slots in the SWN.

12. The method according to claim 1, wherein the FWN is an LBT- and/or an LTE-based wireless network, wherein the SWN is an 802.11-based wireless network, wherein the checking if the channel is free of transmissions is a Clear Channel Assessment (CCA), and wherein the signal indicating part of a total airtime the channel in the SWN will be occupied by the first FWN-S for transmission is a clear to send (CTS)-to-self message.

13. The method according to claim 12, wherein the first PTP is an arbitration inter-frame space (AIFS) and the second PTP is a required time for the CCA.

14. The method according to claim 13, wherein the CTS-to-self message is used by access points to prevent a transmission from the first FWN-S on the channel in the SWN from being interrupted.

15. The method according to claim 1, wherein total airtime the channel in the SWN will be occupied by the first FWN-S for transmission is determined based on a duty-cycle based scheme and includes a number of on periods and off periods.

16. A method for operating a plurality of wireless networks, the plurality of wireless networks including at least a first wireless network (FWN) and a second wireless network (SWN), wherein the FWN includes one or more first network stations (FWN-S), wherein the SWN includes one or more second network stations (SWN-S), wherein transmission between the SWN-S within the SWN is performed via channels, wherein after each successful transmission a channel is free of transmissions for a predetermined time period (PTP), and wherein the FWN and the SWN operate at least in part in overlapping frequency bands, the method comprising:
  blocking a channel in the SWN by a first FWN-S connected to the FWN and the SWN within an overlapping frequency band, wherein a time for performing blocking after a busy channel is smaller than a PTP; and
  indicating part of a total airtime the channel in the SWN will be occupied by the first FWN-S for transmission, wherein the total airtime is computed as a sum of time slots used for successful transmission, their number being computed such that the transmission performance of the SWN is not degraded more than the level of transmission performance is degraded if the first FWN-S would be operating for transmission within the SWN only, and
  wherein the total airtime is recomputed periodically.

17. A system comprising:
a first wireless network (FWN); and
a second wireless network (SWN),
wherein the FWN includes one or more first network stations (FWN-S)
wherein the SWN includes one or more second network stations (SWN-S),
wherein transmission between the SWN-S within the SWN is performed via channels,
wherein after each successful transmission, a channel in the SWN is free of transmissions for a predetermined time period (PTP),
wherein the FWN and the SWN operate, at least in part, in overlapping frequency bands,
wherein a first FWN-S is adapted to:
block, during a second PTP at a beginning of a respective first PTP, a channel in the SWN, the first FWN-S being connected to the FWN and SWN within an overlapping frequency band, the second PTP being shorter than the first PTP, and
transmit, after the second PTP but before an end of the respective first PTP, a signal indicating part of a total airtime the channel in the SWN will be occupied by the FWN-S for transmission,
wherein the total airtime is computed as a sum of a number of time slots required for successful transmission, the number of time slots being computed such that a transmission performance of the SWN is not degraded more than a level of transmission performance degradation caused by an addition of an SWN-S to the SWN.

* * * * *